United States Patent
Yu et al.

(10) Patent No.: US 10,040,988 B2
(45) Date of Patent: Aug. 7, 2018

(54) HIGH-EFFICIENCY MILK-LIKE FRICTION REDUCER WITH INSTANT DISSOLUTION FOR SHALE GAS SLICK WATER FRACTURING

(71) Applicants: Weichu Yu, Hubei (CN); Jun Wu, Houston, TX (US)

(72) Inventors: Weichu Yu, Hubei (CN); Jun Wu, Houston, TX (US)

(73) Assignee: Phoenix C&W, Inc., Houston, TX (US)

( * ) Notice: Subject to any disclaimer, the term of this patent is extended or adjusted under 35 U.S.C. 154(b) by 0 days.

(21) Appl. No.: 15/543,235

(22) PCT Filed: Feb. 28, 2015

(86) PCT No.: PCT/CN2015/073437
§ 371 (c)(1),
(2) Date: Jul. 12, 2017

(87) PCT Pub. No.: WO2016/134548
PCT Pub. Date: Sep. 1, 2016

(65) Prior Publication Data
US 2017/0355898 A1    Dec. 14, 2017

(51) Int. Cl.
| | |
|---|---|
| C09K 8/68 | (2006.01) |
| C08L 33/10 | (2006.01) |
| C08L 39/02 | (2006.01) |
| C08L 33/08 | (2006.01) |
| C01D 5/00 | (2006.01) |
| C01D 3/04 | (2006.01) |

(52) U.S. Cl.
CPC ............. *C09K 8/68* (2013.01); *C08L 33/08* (2013.01); *C08L 33/10* (2013.01); *C08L 39/02* (2013.01); *C01D 3/04* (2013.01); *C01D 5/00* (2013.01)

(58) Field of Classification Search
None
See application file for complete search history.

(56) References Cited

U.S. PATENT DOCUMENTS

| | | | |
|---|---|---|---|
| 4,489,180 A | 12/1984 | Lundberg et al. | |
| 2016/0040057 A1 | 2/2016 | Favero et al. | |

FOREIGN PATENT DOCUMENTS

| | | |
|---|---|---|
| CN | 102977877 A | 3/2013 |
| CN | 103013488 A | 4/2013 |
| CN | 103627380 A | 3/2014 |
| CN | 103937484 A | 7/2014 |
| EP | 2789670 A1 | 10/2014 |

OTHER PUBLICATIONS

English translation of CN 103937484 A, Jul. 23, 2014.*
International Search Report in the parent PCT application No. PCT/CN2015/073437, dated Dec. 9, 2015.
IPRP in the parent PCT application No. PCT/CN2015/073437, dated Sep. 5, 2017.

* cited by examiner

Primary Examiner — Jeffrey Washville
(74) Attorney, Agent, or Firm — Chen Yoshimura LLP

(57) ABSTRACT

The present invention relates to a milk-like friction reducer used in slick water fracturing and belongs to the technical field of oilfield chemicals. This friction reducer is obtained via free radical polymerization in water by using component A, component B and component C; wherein said component A is a mix of nonionic water-soluble monomers having carbon-carbon double bond; wherein said component B is a mix of water-soluble polymeric stabilizers obtained from monovalent cationic monomers; and wherein said component C is a mix of monovalent inorganic salts. The present invention is environmentally-friendly and easy to use. Its subsequent friction reducer is convenient to add on-the-fly and leads to no foaming without adding anti-foamer. Moreover, unlike other regular friction reducers, it is tolerant with various brines and compatible with common oilfield additives. The subject friction reducer can achieve an extent of friction reduction of greater than 70%.

1 Claim, No Drawings

HIGH-EFFICIENCY MILK-LIKE FRICTION REDUCER WITH INSTANT DISSOLUTION FOR SHALE GAS SLICK WATER FRACTURING

BACKGROUND OF THE INVENTION

Field of the Invention

The present invention relates to a milk-like high-performing water-borne friction reducer with rapid dissolution and high compatibility for hydraulic fracturing and belongs to the area of oilfield chemicals.

Description of Related Art

In recent years, due to the extensive discovery and exploitation of shale gas fields, hydraulic fracturing based upon slick water is getting more and more attention to enhance reservoir permeability and conductivity.

Slick water fracturing is based upon the use of small amounts of friction reducing agent and other chemical additives, as well as proppants, in waters or brines. This work fluid can be pumped at high velocity to a subterranean formation so that a transformation of the oil and gas reservoir is to take place with enhanced permeability, conductivity and subsequent oil and gas production capacity. Therefore, the performance of the friction reducing agent is directly linked to the likelihood of effectively fracturing a well. Currently, a common friction reducing agent is based upon polymer powder prepared from monomers via bulk polymerization. It has drawbacks of inclination to ball and hard to dissolve, which lead to vast waste of manpower and materials during fracking. Attempts were made to add surfactants to this type of dry powder friction reducer to improve its dispersibility. However, the result is often below expectation with side effects such as foaming. Anti-foamer may have to be added when foaming takes place. Another type of friction reducer is represented by W/O inverse emulsion friction reducer (Patent Application Publication No. "CN103013488A", entitled "Slick water fracturing fluid drag reducer and preparation method thereof"). Such a friction reducer is also difficult to disperse in water and the subsequent fluid remains turbid even after 96 hours' agitation, which negatively impacts the outcome of slick water fracturing.

SUMMARY

The objective of the present invention is to provide an environmentally-friendly, high-efficiency, rapidly-dissolving and non-foaming friction reducer with enhanced compatibility and brine tolerance, in contrast to its counterparts such as dry powder and W/O emulsion. The subject friction reducer in this disclosed invention can reach over 70% friction reduction, and mitigate the issues pertaining to dry powder and W/O emulsion-based friction reducers. The latter are shown frequently to prone to balling, slow dissolution and poor compatibility with metal ions and other typical oilfield chemicals.

The present invention enables the objectives described above via the following technical solution:

A milk-like friction reducer for slick water shale well fracturing is obtained by free radical polymerization in aqueous phase comprising component A, component B and component C with the use of a free radical initiator of less than 0.1% of the total weight of the reaction mixture; the features of the invention include the following:

1) The component A is a mix of nonionic water-soluble monomers containing carbon-carbon double bond with the composition listed below:
   2-hydroxyethyl acrylate 1-5%,
   2-hydroxyethyl methacrylate 1-8%,
   2-hydroxypropyl acrylate 1-5%,
   2-hydroxypropyl methacrylate 1-10%,
   ethoxy-2-hydroxyethyl acrylate 1-10%,
   ethoxylated-2-hydroxyethyl methacrylate 1-2%,
   hydroxymethyl styrene 1-3%,
   vinyl acetate 1-5%,
   acrylamide 1-20%;

2) The component B is a mix of polymeric stabilizers obtained from water-soluble monovalent cationic monomers. These polymeric stabilizers are characterized with molecular weight between 100,000 and 2,000,000. The component B is composed of the following:
   poly{[2-(methacryloyloxy)ethyl]trimethylammonium chloride} 1-6%,
   poly{[2-(acryloyloxy)ethyl]trimethylammonium chloride} 1-8%,
   poly(vinylbenzyltrimethylammonium chloride) 1-16%,
   poly(diallyldimethylammonium chloride) 1-12%;

The component C is a mix of monovalent cation inorganic salts with the following composition:
   sodium chloride 1-12%,
   ammonium sulfate 1-32%,
   potassium chloride 1-33%,
   sodium sulfate 1-33%;

The rest of the reaction mixture is water.

The present invention is advantageous over the prior arts in that it solvates quickly into water and brines and can achieve over 70% friction reduction instantaneously. It mitigates the issues of forming "fish eyes" and poor compatibilities with brines and other typical chemical additives, which directly impact the feasibility of slick water fracturing. In addition, the subject milk-like friction reducing agent is environmentally-friendly, non-foaming and applicable across a broad spectrum of temperatures.

BRIEF DESCRIPTION OF THE DRAWINGS

None.

DETAILED DESCRIPTION OF PREFERRED EMBODIMENTS

A milk-like friction reducer for slick water shale well fracturing is obtained by free radical polymerization in aqueous phase comprising component A, component B and component C with the use of a free radical initiator of less than 0.1% of the total weight of all the reaction mixture; the features of the invention include the following:

1) The component A is a mix of non-ionic water-soluble monomers containing carbon-carbon double bond with the individual monomers listed below:
   2-hydroxyethyl acrylate 1-5%,
   2-hydroxyethyl methacrylate 1-8%,
   2-hydroxypropyl acrylate 1-5%,
   2-hydroxypropyl methacrylate 1-10%,
   ethoxy-2-hydroxyethyl acrylate 1-10%,
   ethoxylated-2-hydroxyethyl methacrylate 1-2%,
   hydroxymethyl styrene 1-3%,
   vinyl acetate 1-5%,
   acrylamide 1-20%;

The component B is a mix of polymeric stabilizers prepared from water-soluble monovalent cationic monomers. The molecular weights of these polymeric stabilizers are between 100,000 and 2,000,000. The component B is composed of the following:

poly{{2-(methacryloyloxy)ethyl}trimethylammonium chloride} 1-6%,
poly{{2-(acryloyloxy)ethyl}trimethylammonium chloride} 1-8%,
poly(vinylbenzyltrimethylammonium chloride) 1-16%,
poly(diallyldimethylammonium chloride) 1-12%;

The component C is a mix of monovalent cation inorganic salts. The identify and the weight percentage of ingredients in component C is as the following:

sodium chloride 1-12%,
ammonium sulfate 1-32%,
potassium chloride 1-33%,
sodium sulfate 1-33%;

The rest of the reaction mixture is water.

Two specific embodiments of the present invention are described below for the preparation of 100 kg of milk-like rapidly-dissolving, high-efficiency friction reducing agent.

EXAMPLE 1

The weights of each ingredient in component A, component B, component C and water are listed below:

Component A: 2-hydroxyethyl acrylate 1 kg, 2-hydroxyethyl methacrylate 1 kg, 2-hydroxypropyl acrylate 1 kg, 2-hydroxypropyl methacrylate 1 kg, ethoxylated-2-hydroxyethyl acrylate 5 kg, ethoxylated-2-hydroxyethyl methacrylate 2 kg, hydroxymethyl styrene 3 kg, vinyl acetate 1 kg, and acrylamide 4 kg. Component A accounts for 19% of the total weight of the reaction mixture.

Component B: Poly{{2-(methacryloyloxy)ethyl}trimethylammonium chloride} 1 kg, poly{{2-(acryloyloxy)ethyl}trimethylammonium chloride} 2 kg, poly(vinylbenzyltrimethylammonium chloride) 2 kg, poly(dimethyldiallylammonium chloride) 2 kg. Component B accounts for 7% of the total weight of all the reaction mixture.

Component C: sodium chloride, 5 kg, ammonium sulfate 10 kg, potassium chloride 1 kg, sodium sulfate 5 kg. Component C accounts for 21% of the total weight of the reaction mixture.

Water: 53 kg.

The above-mentioned Component A, Component B and Component C with a total weight of 47 kg were added to 53 kg of water under agitation. The reaction mixture was heated slowly to 60° C., after which 10 g of ammonium persulfate was introduced to initiate the polymerization. After 10 hours, the reaction was cooled down to 30° C., to obtain milk-like friction reducer.

EXAMPLE 2

The weights of each ingredient in component A, component B, component C and water are listed below:

Component A: 2-hydroxyethyl acrylate 2 kg, 2-hydroxyethyl methacrylate 2 kg, 2-hydroxypropyl acrylate 2 kg, 2-hydroxypropyl methacrylate 1 kg, ethoxylated-2-hydroxyethyl acrylate 4 kg, ethoxylated-2-hydroxyethyl methacrylate 2 kg, hydroxymethyl styrene 1 kg, vinyl acetate 2 kg, and acrylamide 3 kg. Component A accounts for 19% of the total weight of the reaction mixture.

Component B: poly{{2-(methacryloyloxy)ethyl}trimethylammonium chloride} 1 kg, poly{{2-(acryloyloxy)ethyl}trimethylammonium chloride} 3 kg, poly(vinylbenzyltrimethylammonium chloride) 1 kg, poly(dimethyldiallylammonium chloride) 1 kg. Component B accounts for 6% of the total weight of the reaction mixture.

Component C: sodium chloride 5 kg, ammonium sulfate 10 kg, potassium chloride 5 kg, sodium sulfate 5 kg. Component C accounts for 25% of the total weight of the reaction mixture.

Water: 50 kg.

The above-mentioned Component A, Component B, Component C were added to 50 kg of water under agitation. The reaction mixture was slowly warmed to 60° C. before 5 g of ammonium persulfate was introduced to initiate the polymerization. The reaction was kept at 60° C. for 10 hours before it was cooled to 30° C. to obtain a subject friction reducer.

The above-mentioned examples are two preferred embodiments of the present invention. However, the present invention is not limited in any form by the preferred embodiments. Any derivatization or transformation by those having ordinary skill of the arts after reading this disclosure, is within the spirit and scope of the current invention and therefore is strictly prohibited.

What is claimed is:

1. A milk-like aqueous friction reducer for slick water shale well fracturing;

wherein said friction reducer is obtained via free-radical polymerization in water by using component A, component B and component C with using a free radical initiator, wherein this free radical initiator is less than 0.1% of the total weight of all the reaction mixture;

wherein, said component A is a mix of nonionic water-soluble monomers having carbon-carbon double bond, and is composed of the following monomers having each of their percentages based upon the total weight of the reaction mixture:

2-hydroxyethyl acrylate 1-5%,
2-hydroxyethylmethyl methacrylate 1-8%,
2-hydroxypropyl acrylate 1-5%,
2-hydroxypropyl methacrylate 1-10%,
ethoxylated-2-hydroxyethyl acrylate 1-10%,
ethoxylated-2-hydroxyethyl methacrylate 1-2%,
hydroxymethyl styrene 1-3%,
vinyl acetate 1-5%,
acrylamide 1-20%;

wherein, said component B is a mix of polymeric stabilizers prepared from water-soluble monovalent cationic monomers and is having molecular weight between 100,000 and 2,000,000, and is composed of the following:

poly{[2-(methacryloyloxy)ethyl]trimethylammonium chloride} 1-6%,
poly{[2-(acryloyloxy)ethyl]trimethylammonium chloride} 1-8%,
poly(vinylbenzyltrimethylammonium chloride) 1-16%,
poly(dimethyldiallylammonium chloride) 1-12%;

wherein, said component C is a mix of monovalent cation inorganic salts and is composed of the following:

sodium chloride 1-12%,
ammonium sulfate 1-32%,
potassium chloride 1-33%,
sodium sulfate 1-33%;

wherein, the rest of the reaction mixture is water.

* * * * *